Jan. 11, 1938.  W. FORSTNER  2,104,833
BELT ORNAMENT END CONNECTION
Filed July 16, 1935
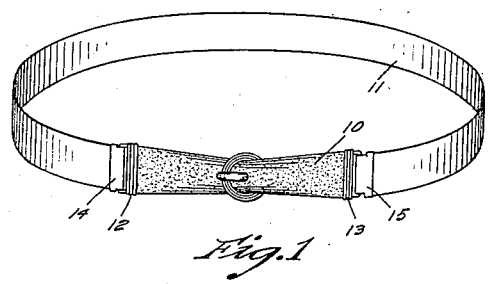
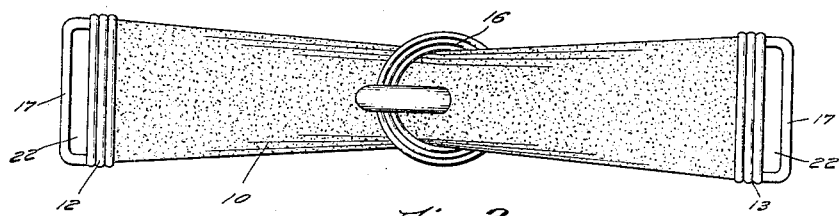
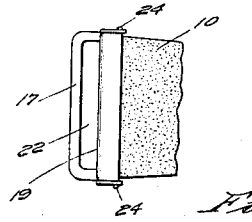 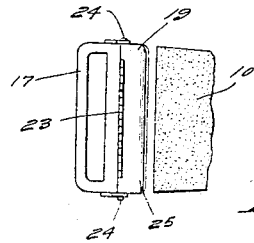
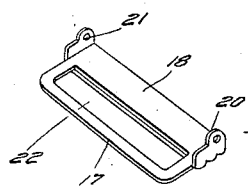 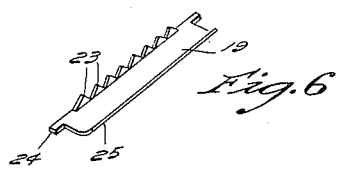
Inventor
Walter Forstner
By Nathaniel Frucht
Attorney Patented Jan. 11, 1938

2,104,833

UNITED STATES PATENT OFFICE 2,104,833

BELT ORNAMENT END CONNECTION

Walter Forstner, Irvington, N. J., assignor to Forstner Chain Corporation, a corporation of New Jersey Application July 16, 1935, Serial No. 31,558

1 Claim. (Cl. 24—191)

My present invention relates to dress ornamentation, and has particular reference to novel ornament constructions suitable for belts.

The ornaments designed to form part of belts, girdles and the like usually include a central part of ornamental material and two end connections which may receive belt hooks, or may have belt ends passed therethrough. The end connections have heretofore included a clamp portion for securing to the ends of the ornament part, and a separate loop portion which has been welded or otherwise secured to the clamp portion. It has been found difficult, however, to provide a clamp portion which will firmly grip the end of the ornament with a loop portion which cooperates therewith so as to present a pleasing artistic appearance. It is a principal object of my invention to provide an ornament end which may be readily and securely attached to any ornament material suitable for the desired purpose, and which includes as an integral part thereof the necessary loop portion for attaching the ornament to the remainder of the belt.

Moreover, the cost of manufacture of ornament ends has heretofore been relatively expensive, as the securing of the loop portion to the clamp portion requires skillful workmanship in order to present a pleasing appearance. It is therefore a further object of my invention to simplify the construction of the ornament and connection so as to reduce the cost of manufacture.

With the above and other objects and advantageous features in view my invention consists of a novel arrangement of parts, more fully disclosed in the detailed description following in conjunction with the accompanying drawing, and more specifically defined in the claim appended thereto.

In the drawing,

Fig. 1 is a prospective view of a belt having an ornament provided with the novel end connections;

Fig. 2 is a plan view of the ornament;

Fig. 3 is a fragmentary bottom view of one end of Fig. 2;

Fig. 4 is a view similar to Fig. 3 but showing the end connection in opened position; and Figs. 5 and 6 are respectively perspective views of the end connection parts.

Referring to the drawing, an ornament 10 is shown attached to a belt or girdle part 11, the ornament having end connections 12, 13 with which hooks 14, 15 secured to the ends of the belt part 11 cooperate to form the completed belt. As shown in Fig. 2, the ornament 10, which may be of any material such as metal mesh, metal, fabric, or the like, and may include one or more additional ornaments 16, has the two end connections 12, 13 clamped to its ends, these end connections comprising loop portions 17. Preferably, the end connections 12 comprise two elements 18, 19, see Figs. 5 and 6, the element 18 being a stamping having integral struck-up pivot arms 20 provided with pivot openings 21, the loop portion 17 being spaced from the main body of the stamping so as to provide an opening 22 into which end hooks such as represented at 14 and 15 in Fig. 1 can enter to releasably engage the loop end, or through which the fabric of a belt part may be passed.

The element 19, also preferably formed as a stamping, includes upwardly extending teeth 23 and lateral pivot lugs 24 which are adapted to be received in the openings 21, the stamping 19 being curved upwardly as indicated at 25 to cooperate with the stamping 19, whereby a releasable clamp for detachably engaging the end of the ornament is obtained.

The novel end connection thus consists of two easily manufactured stampings which are assembled to form an integral clamp and end loop arrangement, the outer surface of the end connection being suitably ornamented in any desired manner. The cost of manufacturing is reduced, as the operations comprise two stampings and one assembly, and the resultant end connection is ornamental in appearance, and is readily attached to the ends of any ornament which is made of a material adapted to be gripped between the teeth 23 and the back of the stamping 18. Although teeth are preferred when the ornament is made of metal mesh or of fabric, a sharp edge adapted to be impressed into the material of the ornament may be used instead.

Although the novel end connection is primarily designed for a belt ornament, the same type of connection may be used for other jewelry articles such as hat and dress ornaments, and the like.

While I have described a specific constructional embodiment of my invention, it is obvious that desired changes in the arrangement of the parts, in their size and in their materal, may be made to suit the requirements of different designers, without departing from the spirit and the scope of the invention as defined in the appended claim.

I claim:

In an ornamental end connection, a base of general rectangular outline having a solid back portion and a front loop portion and two pivot ears struck up from said back portion and including side flanges extending to the front edge of the solid back portion, and a clamp element of generally rectangular outline pivotally mounted in said side flanges and having a depending clamp portion cooperating with said solid back portion, the sides of said clamp element being coextensive with said flanges and the front edge of said clamp element being substantially in line with the front edge of said solid back portion when said clamp element is in closed position, said front edge of said clamp element having a forwardly bent portion adapted to extend towards and substantially contact with the front edge of said solid back portion.

WALTER FORSTNER.